(12) United States Patent
Lord

(10) Patent No.: US 9,069,790 B2
(45) Date of Patent: Jun. 30, 2015

(54) MULTI-THREADED MESSAGE PASSING JOURNAL

(71) Applicant: Stephen P. Lord, Prior Lake, MN (US)

(72) Inventor: Stephen P. Lord, Prior Lake, MN (US)

(*) Notice: Subject to any disclaimer, the term of this patent is extended or adjusted under 35 U.S.C. 154(b) by 317 days.

(21) Appl. No.: 13/803,541

(22) Filed: Mar. 14, 2013

(65) Prior Publication Data

US 2014/0280394 A1    Sep. 18, 2014

(51) Int. Cl.
*G06F 17/30*    (2006.01)

(52) U.S. Cl.
CPC ...... *G06F 17/30218* (2013.01); *G06F 17/3012* (2013.01); *G06F 17/30227* (2013.01)

(58) Field of Classification Search
USPC .......................................................... 707/823
See application file for complete search history.

(56) References Cited

U.S. PATENT DOCUMENTS

| | | | |
|---|---|---|---|
| 6,625,602 B1* | 9/2003 | Meredith et al. | 707/703 |
| 2013/0073532 A1* | 3/2013 | Bachar et al. | 707/704 |

* cited by examiner

*Primary Examiner* — Amresh Singh (57) ABSTRACT

Example apparatus and methods protect state in a file system using a message-passing multi-threaded journal. One example apparatus stores, in memory, data and metadata affected by a file system transaction. The apparatus may run a thread that receives the file system transaction from the file system and that produces a set of atomic operations configured to complete the file system transaction. The apparatus may also run a thread that records a set of journal entries associated with the set of atomic operations to protect the file system while the atomic operations complete. The journal entries may be written on a non-volatile computer-readable medium. The apparatus may also run a thread that co-ordinates usage of space on the computer-readable medium. Rather than synchronizing journal activity with locks, the threads running on the example apparatus may synchronize their activity using message passing.

9 Claims, 7 Drawing Sheets

MULTI-THREADED MESSAGE PASSING JOURNAL

BACKGROUND

File systems store files and store information about files. The information stored in files may be referred to as data. The information about files may be referred to as metadata. When the data in a file changes, a file system may want to update the metadata about that file. For example, if the contents of a file are changed, the file system may want to memorialize the time at which the change was made and by whom the change was made. A journal may be employed to protect the data and metadata in a file system.

Making a change to a file may require the file system to perform updates to several independently stored pieces of metadata that the underlying storage does not support as an atomic operation. This set of changes takes the file system from one consistent state to another. Undesirable conditions may arise if a series of operations are only partially recorded. Thus, a file system may be required to treat a series of operations as a transaction. Example transactions may include allocating space for a file, creating a file, updating a file, deleting a file, or other operations. While the file system may choose to treat operations as a transaction, an underlying operating system or other actor (e.g., storage system) may only be able to guarantee that individual members of the series of operations are performed as atomic operations.

Therefore, file systems may use a journal to help support correctly performing a series of operations as a single file system transaction. The journal may be, for example, a disk-based structure that can store information about operations to be performed to transition a file system from a first state to a second state. The journal may be used to store a complete representation of the set of operations that are to be completed for the file system transaction. For example, the journal may store a linear sequence of underlying operations that are to be performed as part of the file system transaction. Once the set of operations to be performed are written in the journal, the individual updates to metadata can be performed safely in the knowledge that if something goes wrong, it is possible to recover the complete set and reapply them later using the information stored in the journal.

A journal may play a record-keeping role to allow for safe transitions from one stable state to another stable state in a file system in a manner that can be guaranteed by the infrastructure underlying the file system. A journal provides a persistent structure that allows the file system to restore itself to a self-consistent state by examining its contents after a crash and using them to reconstruct the recently updated metadata components to a consistent state.

A "lock", as used in computer science and herein, refers to a synchronization mechanism for enforcing limits on access to a resource or other item. A lock may be designed to enforce a mutual exclusion concurrency control policy. A lock may be an advisory lock where threads willfully cooperate by acquiring the lock before accessing the protected resource. A lock may be a mandatory lock where an attempt to access the protected resource before the lock has been acquired will force an exception in the entity attempting the access. A lock may be, for example, a binary lock, which is also referred to as a semaphore. Different locks may implement different locking strategies. For example, a thread may have its execution blocked until a lock is acquired. A spin lock employs a lock strategy where the requesting thread spins (e.g., busy waits) until the lock is acquired. A spinlock may be efficient if threads are blocked for very short periods of time, but can introduce significant processing overhead when threads block for longer periods of time.

There are many conventional journals. Many of these conventional journals are associated with database processing. Typically these journals have been single-threaded monolithic applications that have employed numerous locks to control process flow and to provide synchronization. However, using locks may be inefficient because locks can force one process to wait while another process completes. Moving in lock-step where one action cannot begin until another action completes is appropriate in many circumstances, but may lead to inefficiencies when some operations could be performed in parallel.

File systems transfer in-memory state (e.g., file metadata) to disk. The in-memory state may be transient or unprotected while the on-disk state is more permanent and more protected. The journal may be, for example, a disk-based structure. A journal performs a number of different actions associated with protecting metadata until the transfer of state is complete. For example, the journal may protect in-memory-only changes by writing to disk a complete representation of the set of operations that are to be completed for the file system transaction. Once the set of operations to be performed are written in the journal on disk, the set of operations can be started safely in the knowledge that if something goes wrong it may be possible to back out of the set of operations using the information stored in the journal on disk. After the in-memory-only changes have been completed and propagated to disk, then the protecting journal entries can be deleted.

One issue with file systems arises due to the difference in latency between memory and non-memory (e.g., disk, tape) storage. This latency can produce conditions where changes made in one area (e.g., memory) are out of sync with changes made in another area (e.g., disk). Additionally, this latency motivates a file system to store in memory changes that are to be made to data on disk and then to make the actual changes on disk at a later time. For example, a series of reads and writes to a file may be made virtually in memory at a first time and then only made physically on disk at a second, later time. An efficient journal would be able to hold more metadata in the journal. Holding more metadata in memory would improve efficiency by reducing the amount of input/output (i/o) to disk that needs to be performed to maintain the file system state. This efficiency is related to the observed phenomenon of locality of file touching. If a file is touched at a first time, then it is likely that it may be touched again relatively soon. If the metadata for this file can be held in memory until the second or subsequent touches occur, then a disk i/o to record the first touch on disk may be avoided. However, the conventional lock-based monolithic journal approaches may miss opportunities to hold metadata in memory due to lock-step requirements to flush journal items in certain orders controlled by the locks.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 1 illustrates a file system interacting with a journal.

DETAILED DESCRIPTION

A journal requires a state machine. Example apparatus and methods implement the journal state machine using a set of message passing threads. Separate threads can be configured to perform the different actions associated with a journal. A message passing approach facilitates reducing the number of locks employed to implement the state machine, which in turn may reduce the amount of waiting experienced by a journal. Reducing the amount of waiting experienced by a journal can improve file system performance.

A "thread" as used in computer science and herein, refers to a sequence of programmed instructions that can be managed independently by an operating system scheduler. A thread may be referred to as a light-weight process. Threads and processes are implemented differently in different operating systems, however, generally, a thread is contained inside a process. Multiple threads may co-exist within a process. The co-existence may include sharing resources. Processes generally do not share resources. Different threads may also share the instructions of a process and the context of a process. In a single processing system, multi-threading may be implemented using time division multiplexing, which may also be referred to as multitasking. On a multi-processor system, multiple threads may run at the same time. In one example, a first thread may run on a first processor while a second thread runs on a second processor.

One example multi-threaded message passing journal includes a group of transaction threads, a reservation thread, a sequencing thread, and a commitment thread that pass messages. In one embodiment, even though a lock may still be employed to synchronize certain actions, fewer locks are used than in conventional systems because synchronization is achieved through the message passing protocol.

In one embodiment, a file system may provide a file system transaction to the multi-threaded message-passing journal. File system operations are performed by the transaction threads which may then break the file system transaction down into a set of atomic operations that can be performed by the underlying infrastructure. Before the atomic operations for the transaction are begun, space may be found for journal entries associated with the set of atomic operations. Once assembled, buffer space for writing the journal entries for a transaction may be found. The journal entries may be written by writers (e.g., i/o threads) provided by underlying infrastructure. The writers may also participate in performing the atomic operations. The writers may perform the operations and inform the sequencing thread when the operations are complete. The sequencing thread may then pass messages to the reservation thread and the commitment thread concerning completion of the atomic operations. When the commitment thread knows that an atomic operation has completed, the commitment thread can commit the metadata associated with the file system transaction. Committing the metadata may include, for example, pushing the metadata to disk. Similarly, when the reservation thread knows that an atomic operation has completed and the associated metadata has been committed, the reservation thread can reclaim the buffer space reserved for the atomic operation. Using a message passing approach for a multi-threaded journal application may reduce the time spent waiting for buffer space to be reclaimed, which in turn may reduce metadata flushes and improve file system performance.

Flushing metadata before it actually needs to be flushed may produce inefficiencies because it may be desirable to hold metadata in memory for as long as possible without being flushed. Holding metadata in memory may allow certain metadata changes (e.g., access time updates) to be skipped over when a subsequent, superseding metadata change occurs. For example, if a file is touched at a first time, its metadata changes at that first time. But, that file might be touched ten more times in the next second after the first time. Each of those touches would change the metadata. In some cases, (e.g., access time only updates), only the last touch (e.g., for access time) may need to be recorded. If a system was forced to flush all ten changes, then ten disk i/o operations would be performed when only one was really needed to record the last change. Following a lock-step approach in a lock-based system may force certain transactions to be flushed in order instead of allowing flexibility to hold some transactions in the journal.

Figure 1:
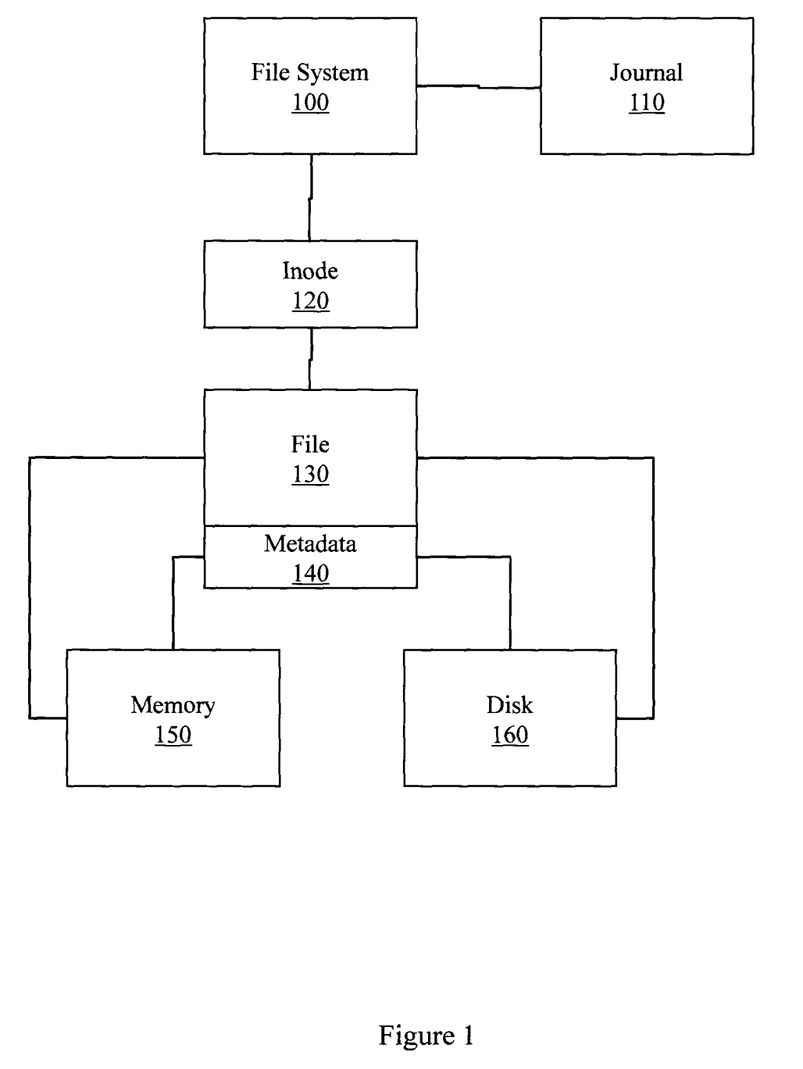

Figure one illustrates a file system 100 interacting with a journal 110. While a user may refer to a file 130 using a file name, the file system 100 may refer to the file 130 using an inode 120. When a change is made to the file 130, there may also be a change to the metadata 140 of the file 130. The metadata 140 may include, for example, the name of the file 130, the size of the file 130, the owner of the file 130, the most recent access time of the file 130, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. While there are changes that have been made only in memory 150, the journal 110 may be used to protect those changes. Conventionally, journal 110 may have been a lock-based monolithic application that performed actions serially. This application describes a multi-threaded message passing journal that may perform more actions in parallel and with less lock-based synchronization.

Figure 2:
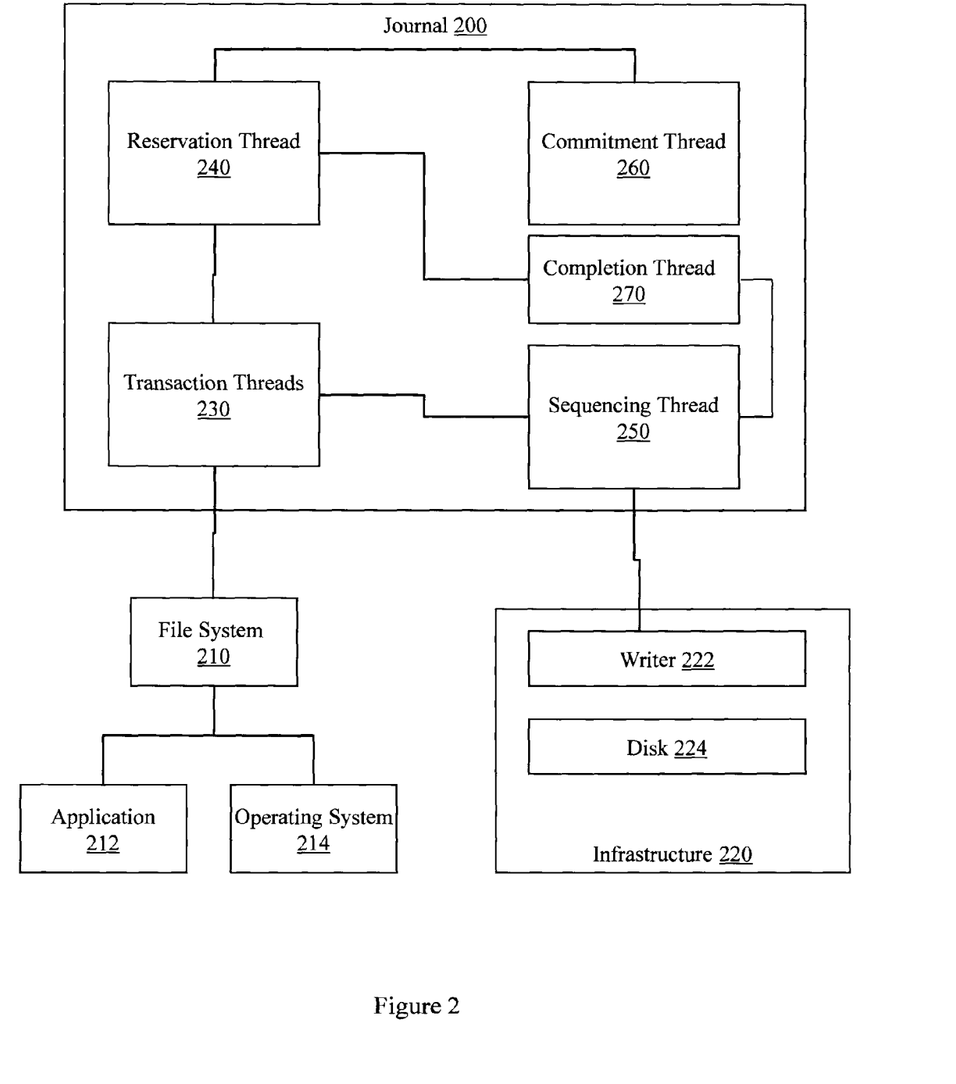
FIG. 2 illustrates a multi-threaded message passing journal configured for use with a clustered file system.

Figure two illustrates an example multi-threaded message passing journal 200. Journal 200 interacts with a file system 210 and with other underlying infrastructure 220. The file system 210 may interact with an application 212, with an operating system 214, or with other processes and devices that may cause the file system 210 to present a file system operation to the journal 200. The underlying infrastructure 220 may include, for example, a writer 222 (e.g., disk i/o thread) configured to interact with a disk 224. While a single writer 222 and a single disk 224 are illustrated, multiple writers 222 or disks 224 may be available in the infrastructure 220. Similarly, while a single application 212 and a single operating system 214 are illustrated, multiple applications 212 and operating systems 214 may interact with the file system 210. In one embodiment, the file system 210 may be a clustered file system that supports maintaining files and metadata across a number of disks for a number of processes. The clustered file system may be, for example, the StorNext® file system from Quantum.

Journal 200 includes transaction threads 230, a reservation thread 240, a sequencing thread 250, a commitment thread 260 and a completion thread 270. Messaging connections may be established between different threads including a connection between the transaction threads 230 and the reservation thread 240, between the transaction threads 230 and the sequencing thread 250, between the sequencing thread 250 and the completion thread 270, and between the reservation thread 240 and the commitment thread 260. Establishing a message connection may include, for example, establishing a socket connection, establishing a remote procedure call connection, establishing a data communications path between the threads, establishing shared memory, or other actions.

In one embodiment, a file system 210 may provide a transaction to the multi-threaded message-passing journal 200. The transaction may be received by the transaction threads 230 which may then break the file system transaction down into a set of atomic operations that can be performed by the underlying infrastructure 220. The transaction threads 230 may pass messages with the reservation thread 240 to request space in the journal for journal entries associated with the set of atomic operations. The reservation thread 240 may respond to the transaction threads 230 when journal space is available and the transaction may proceed. The transaction threads 230 may exchange messages with the sequencing thread 250 to obtain I/O buffer space to write transactions to the disk 224. In one embodiment, a transaction may cover multiple journal buffers while in another embodiment a transaction may have a one-to-one relationship with a journal buffer. The transaction threads 230 may synchronize obtaining new journal buffers with sequencing thread 250. The transaction thread 230 may also pass messages with the sequencing thread 250 concerning the series of atomic operations to instruct the sequencing thread 250 to schedule flushing the series of atomic operations to the on disk journal. The sequencing thread 250 may be configured to provide the journal entries or operations to writers 222 in the infrastructure 220. A writer 222 may be, for example, a process that handles disk i/o, a thread that handles disk i/o, an apparatus that handles disk i/o, or other processes or apparatus. The writers 222 may record the journal entries and may also participate in performing the atomic operations and then inform the sequencing thread 250 when the operations are complete. Since some disk i/o operations may be performed in parallel, the sequencing thread 250 may need to track which atomic operations have been completed and whether the sequence of operations has completed.

The sequencing thread 250 may pass messages to the completion thread 270 that all atomic operations for transactions up to a specific time have completed. The completion thread 270 may track which metadata items are modified in memory and only protected by the journal on disk 224. The completion thread 270 may inform the reservation thread 240 that journal space has been written to. Recall that the reservation thread 240 manages reservation of the on disk space in the journal on disk 224. The reservation thread 240 may pass messages to the commitment thread 260 indicating that some of the in memory metadata should be flushed out to disk to free journal space for future operations. When the commitment thread 260 has received a request to flush metadata, the commitment thread 260 can commit the metadata associated with the oldest file system transactions still in memory. Committing the metadata may include, for example, pushing metadata from memory to disk. When the commitment thread 260 has completed writing metadata out to disk, it may message the reservation thread 240 indicating this. The reservation thread 240 may then reclaim journal space and make it available to future transactions processed by transaction threads 230.

More generally, the journal 200 implements a state machine as a set of communicating threads. There may be threads for breaking transactions in operations, for reserving and reclaiming journal buffer space, for packaging up operations for interaction with infrastructure, for cleaning up after operations, for pushing metadata out to storage, and for other operations.

A conventional journal model associated with, for example, the StorNext® file system, may have used locks to help co-ordinate actions including, but not limited to, creating a transaction per file operation (e.g., create, unlink, allocate) and reserving space for a transaction on a disk log. Reserving space may involve flushing metadata from an active item list to release space. Unnecessary and excessive metadata flushes may negatively impact performance. The actions may also include copying objects to an in core log at the end of a transaction and pinning the object in memory. When the in core buffer is written to disk, items may be unpinned and added to an active item list. When the metadata is flushed out to disk it is removed from an active item list and the journal tail may be moved forward. Note that the log cannot be overwritten until the metadata for the transaction is flushed. Multiple locks may produce multiple delays in this conventional approach.

In one embodiment, journal 200 executes transactions using remote procedure call (RPC) thread pools. One action may include reserving journal space. If there is space available, then the transaction thread 230 may simply claim that space from the journal data structure without having to communicate with another thread. However, if space is not available, then the transaction thread 230 may send a message to the reservation thread 240 requesting a reservation of space. When the space becomes available, the reservation thread 240 may provide a message back to the transaction thread 230. The transaction thread 230 need not block waiting on a lock while it is waiting for the message response. Instead, the transaction thread 230 may continue to receive other transactions and may continue to communicate with the sequencing thread 250 as appropriate. This facilitates improving journal efficiency by removing unnecessary lock-based waiting. Just because a journal does not have sufficient space left to accommodate a transaction does not mean that meaningful work cannot be performed. Thus, rather than blocking to achieve synchronization, the transaction thread 230 may continue to perform other work until such time as the reservation thread 240 messages that sufficient journal space is available.

The reservation thread 240 may be configured to receive messages from other threads (e.g., sequencing thread 250, commitment thread 260) concerning changes to space used in the journal. For example, the reservation thread 240 may receive a message that an atomic operation has completed or that certain metadata has been committed. These messages may allow the reservation thread to update its picture of available storage and thus to message a transaction thread 230 waiting for a message. In one embodiment, the reservation thread 240 may monitor the head and tail locations for a circular buffer used to implement the journal. Movements of the head and tail may be caused by other threads that report their actions to the reservation thread 240. When the reservation thread 240 detects that there is sufficient journal for a pending transaction, the reservation thread 240 can claim that memory and send a message to the transaction thread 230 concerning its pending reservation.

The reservation thread 240 may be configured to calculate the desired amount of journal space to keep free in preparation for future requests for space. When the reservation thread 240 determines that the journal is running low on space, it may message the commitment thread 260 to request the metadata objects associated with oldest portions of the journal be written out to the file system.

The reservation thread 240 may be further configured to message the commitment thread 260 to free a larger portion of the journal when there is no current transaction activity. Thus taking advantage of periods of low activity to write metadata out to disk.

In one embodiment, the sequencing thread 250 manages the state machine for i/o for the journal 200. The sequencing thread 250 may dispatch i/o to a pool of threads that finalize the contents of buffers, generate checksums, and write the contents of buffers to disk. A log buffer may be passed back to the sequencing thread 250 upon i/o completion. In one embodiment, the sequencing thread 250 may use a completion thread 270 to process buffers in strict journal order so that callbacks are executed in journal sequence order instead of i/o completion order. When the i/o associated with a buffer has completed, the completion thread 270 may report operation completion to the reservation thread 240 and then recycle the buffer for use by the sequencing thread 250.

The completion thread 270 may store information about whether a particular piece of metadata is modified in memory. Additionally, the completion thread 270 may store information about whether a transaction has been committed to disk. Storing this information may include passing messages with the sequencing thread 250.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 3:
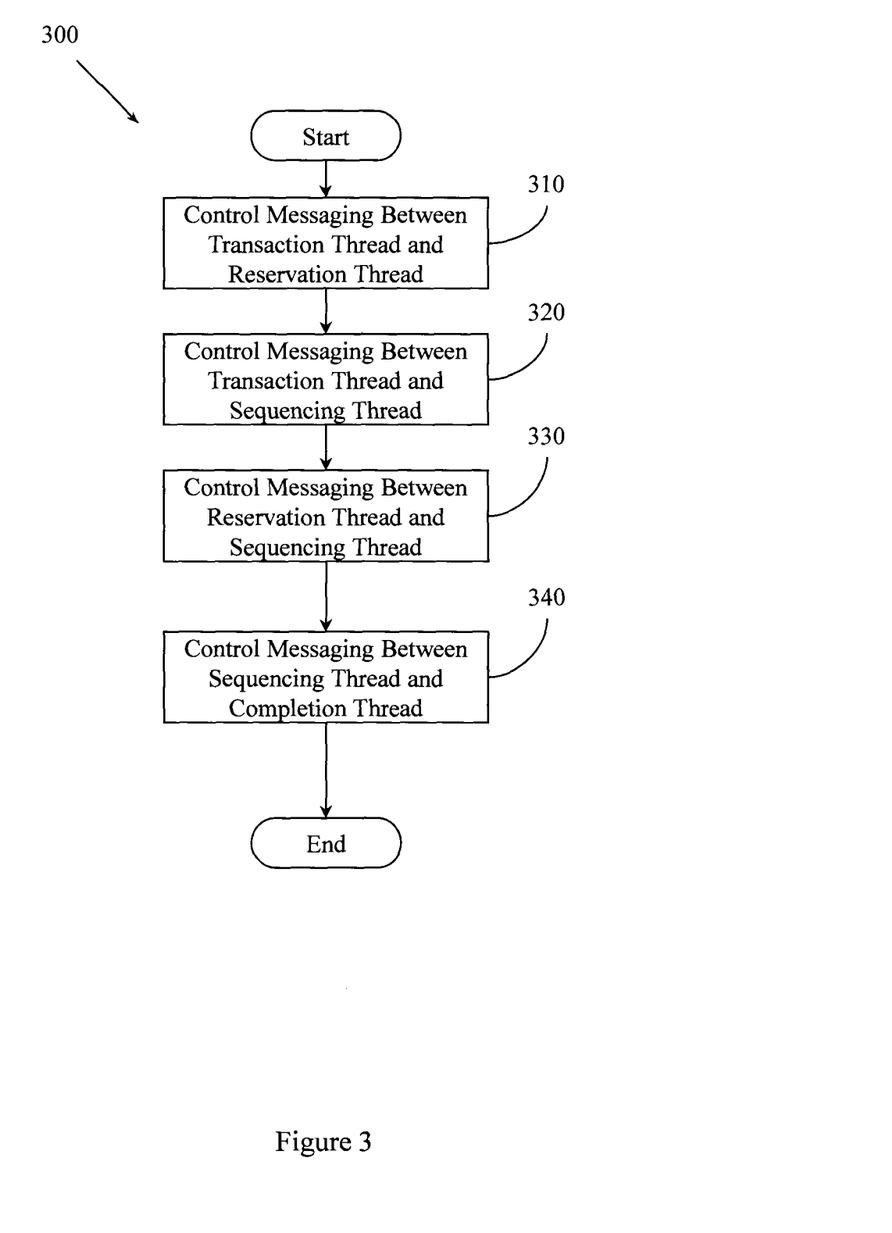
FIG. 3 illustrates an example method associated with a multi-threaded message passing journal.

FIG. 3 illustrates a method 300 associated with a multi-threaded message passing journal. Method 300 includes, at 310, controlling messaging between a transaction thread associated with the multi-threaded message passing journal and a reservation thread associated with the multi-threaded message passing journal. In one embodiment, the transaction thread is configured to receive a file system transaction, to produce a set of atomic operations corresponding to the file system transaction, and to produce a set of journal entries corresponding to the set of atomic operations.

Method 300 also includes, at 320, controlling messaging between the transaction thread and a sequencing thread associated with the multi-threaded message passing journal. In one embodiment, the sequencing thread is configured to interact with device threads that perform input/output of the set of journal entries to the storage. The sequencing thread may also be configured to monitor completion of the set of atomic operations. The sequencing thread may also interact with device threads that participate in performing members of the set of atomic operations.

Method 300 also includes, at 330, controlling messaging between the sequencing thread and the reservation thread. In one embodiment, the reservation thread is configured to manage space in storage where the set of journal entries are to be stored to protect the file system during execution of the file system transaction. Managing space may include sending a request flush message to the commitment thread, where the request flush message indicates that some in-memory metadata should be flushed to disk to free space.

Method 300 also includes, at 340, controlling messaging between the sequencing thread and the completion thread. In one embodiment, the completion thread is configured to send a journal written message to the reservation thread, where the journal written message indicates that the a journal entry has been written.

Figure 4:
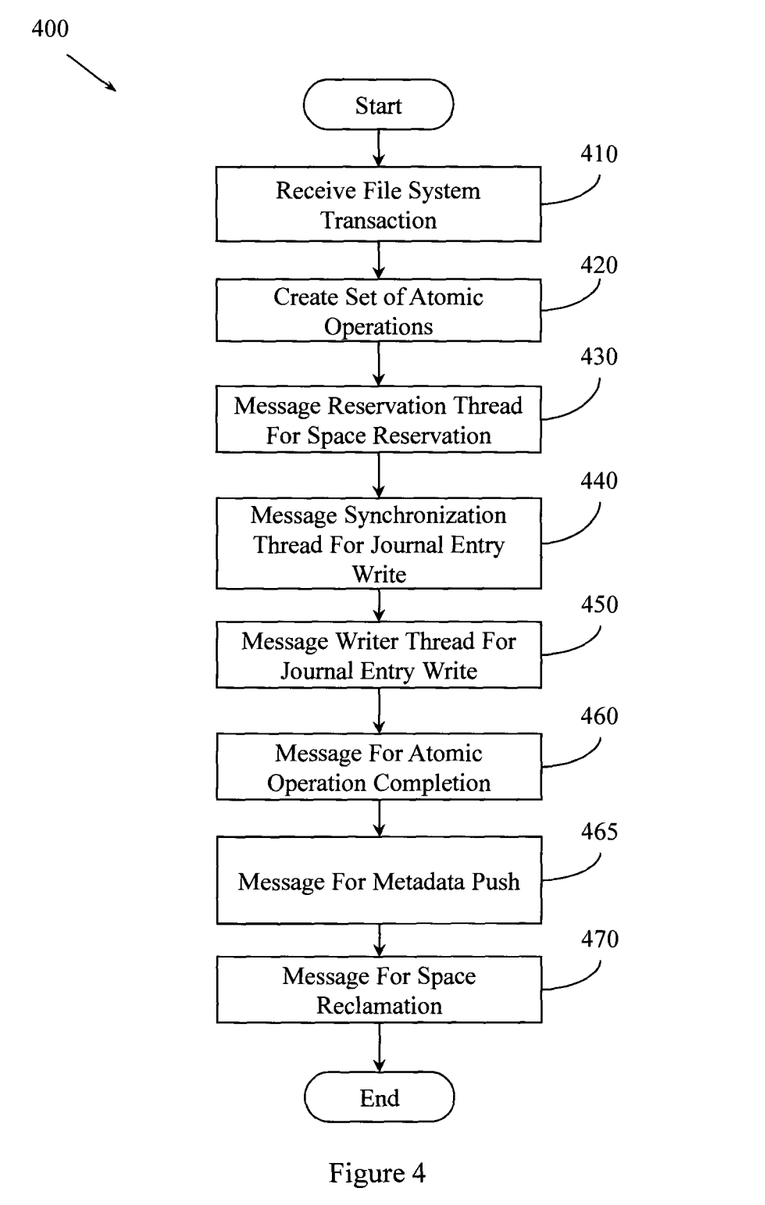
FIG. 4 illustrates an example method associated with a multi-threaded message passing journal.

FIG. 4 illustrates a method 400 associated with a multi-threaded message passing journal. Method 400 includes, at 410, receiving a file system transaction into a transaction thread. The transaction thread may be similar to the transaction thread described in connection with FIG. 3.

Method 400 may also include, at 420, producing the set of atomic operations corresponding to the file system operation. Since a file system may be supported by different infrastructure that has different atomic operations available, the set of atomic operations produced may depend, at least in part, on which operations are supported by the storage. In one embodiment, producing the set of atomic operations includes acquiring a journal entry buffer to store a journal entry concerning a member of the set of atomic operations and populating the journal entry buffer with the journal entry.

Method 400 may also include, at 430, upon determining that insufficient space to accommodate the set of journal entries is available in the storage, controlling the transaction thread to send a reserve space message to the reservation thread. The reserve space message will cause the reservation thread to reserve space sufficient to accommodate the set of journal entries in the storage. In response to this message, the reservation thread may later send a sufficient space message to the transaction thread. The sufficient space message may be sent upon determining that space sufficient to accommodate the set of journal entries has become available in the storage after receiving the reserve space message.

Method 400 may also include, at 440, controlling the transaction thread to send an operation ready message concerning a member of the set of atomic operations to the sequencing thread. In one embodiment, this may include controlling the transaction thread to send an operation ready message to the sequencing thread concerning a journal entry buffer prepared by the transaction thread. The journal buffer may store a journal entry associated with an atomic transaction.

Method 400 may also include, at 450, controlling the sequencing thread to message a device thread to write a journal entry associated the operation ready message. The journal entry may be written to the storage in the space reserved for the set of journal entries. In one example, controlling the sequencing thread to interact with the device thread includes sending a write message to the device thread concerning the journal entry buffer, receiving a written message from the device thread indicating that the journal entry has been written to the storage, and sending a buffer free message to the sequencing thread indicating that the journal entry buffer has been written to storage. In one embodiment, when the device thread, which may also be referred to as a writer thread, participates in performing the atomic operation, the sequencing thread may also message the device thread concerning performing the atomic operation. In this embodiment, the sequencing thread may also message the transaction thread, the reservation thread, or the commitment thread concerning completion of the atomic operation.

Method 400 may also include, at 460, controlling the sequencing thread to send a completion message to the completion thread upon determining that the atomic operations have completed. This may lead to a message being sent a 465 requesting a metadata push, where some in-memory metadata that is only protected by journal entries will be pushed out to disk.

Method 400 may also include, at 470, sending a message that indicates that the set of journal entries has been written to the storage. The commitment thread may be configured to selectively move metadata associated with the file associated with the file system transaction. The commitment thread may move the metadata from a first transient storage location accessible to the file system to a second non-transient storage location accessible to the file system. The first storage location may be, for example, a computer memory and the second storage location may be, for example, a disk drive, a tape, or a solid state drive.

The message sent at 470 may lead the commitment thread to move the metadata from the first storage location to the second storage location. Successfully moving the metadata may lead the commitment thread to send a metadata committed message to the reservation thread. This may be viewed as a message to perform space reclamation, since the metadata has been moved and the corresponding protective journal entries may now be overwritten.

In one example, a method may be implemented as computer executable instructions. Thus, in one example, a computer-readable medium may store computer executable instructions that if executed by a machine (e.g., processor) cause the machine to perform methods 300 or 400. While executable instructions associated with methods 300 and 400 are described as being stored on a computer-readable medium, it is to be appreciated that executable instructions associated with other example methods described herein may also be stored on a computer-readable medium.

Figure 5:
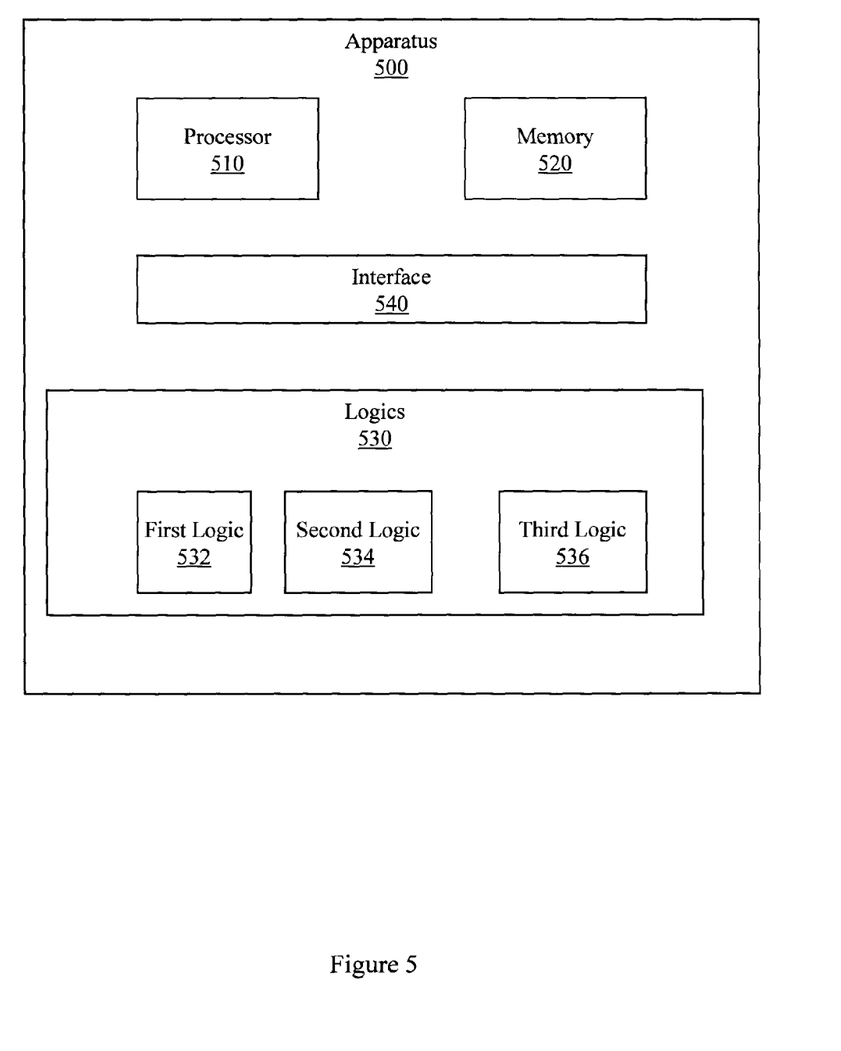
FIG. 5 illustrates an example apparatus associated with a multi-threaded message passing journal.

FIG. 5 illustrates an apparatus 500 that includes a processor 510, a memory 520, and a set 530 of logics that is connected to the processor 510 and memory 520 by an interface 540. The memory 520 may be configured to store data and metadata affected by a file system transaction.

The set 530 of logics may include a first logic 532 that is configured to accept the file system transaction from the file system and to produce a set of atomic operations configured to complete the file system transaction. In one embodiment, the first logic 532 may be configured to message the third logic 536 to request a reservation of space in the computer-readable medium upon determining that insufficient space to accommodate the set of journal entries is available in the computer-readable medium. The first logic 532 may also be configured to message the second logic 534 to request that journal entries for the set of atomic operations be written to the computer-readable medium.

The apparatus 500 may also include a second logic 534 that is configured to produce a set of journal entries associated with the set of atomic operations. The second logic 534 may also be configured to control recording the set of journal entries on a computer-readable medium. In one embodiment, the second logic 534 may be configured to message a writer to cause the set of journal entries to be written to the computer-readable medium. The writer may be, for example, a device i/o thread. The second logic 534 may also be configured to message the third logic 536 to reclaim the space used for the set of journal entries upon determining that the writer has written the set of journal entries and that the set of atomic operations has completed successfully.

The apparatus 500 may also include a third logic 536 that is configured to co-ordinate usage of space on the computer-readable medium for the first logic 532 and the second logic 534. In one embodiment, the third logic 536 may be configured to manage the storage as a circular buffer.

Thus, the first logic 532 may be responsible for reconfiguring a file system transaction into operations that can be performed by the infrastructure underlying the file system, the second logic 534 may be responsible for managing journal space, and the third logic 536 may be responsible for writing things to the journal space and for monitoring and reporting on completion of the atomic operations. In one embodiment, the first logic 532, the second logic 534, and the third logic 536 communicate using message passing. In this embodiment, synchronization of the first logic 532, the second logic 534, and the third logic 536 depends on message passing. In one embodiment, synchronization of the first logic 532, the second logic 534, and the third logic 536 is solely message-based and lock-free.

Figure 6:
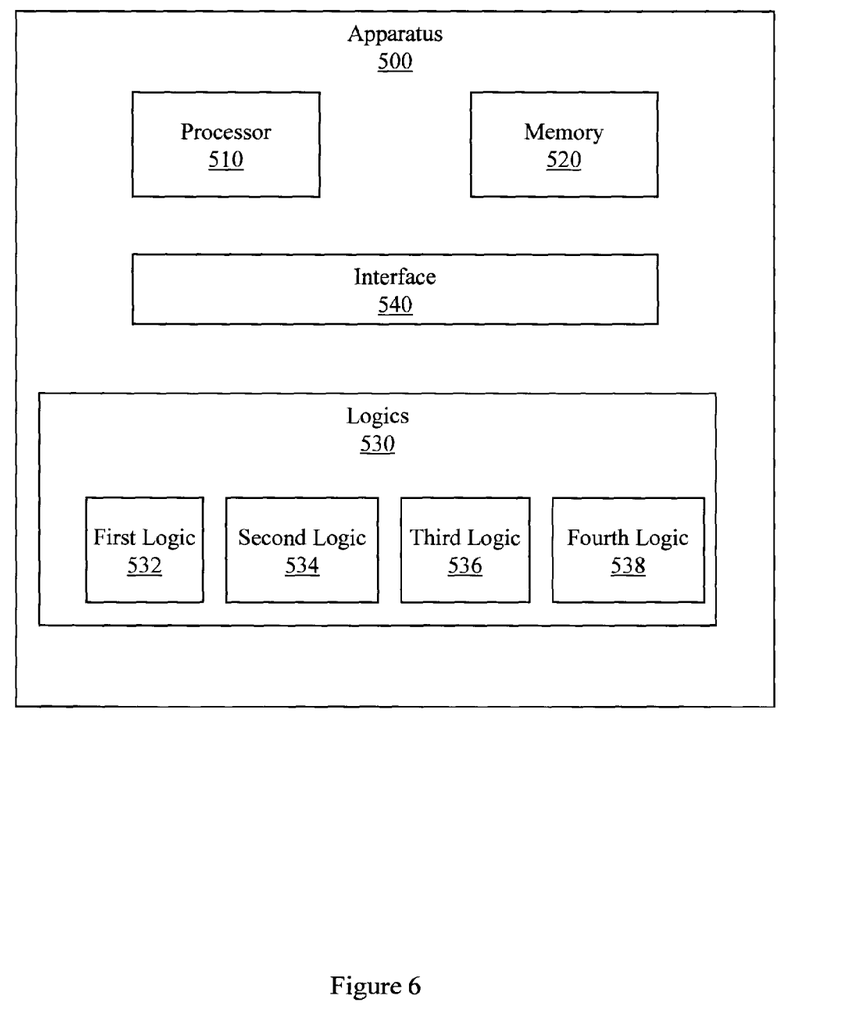
FIG. 6 illustrates an example apparatus associated with a multi-threaded message passing journal.

FIG. 6 illustrates another embodiment of apparatus 500. This embodiment includes a fourth logic 538. The fourth logic 538 may be configured to commit the metadata affected by the file system transaction from the memory 520 to a non-volatile storage device upon receiving a message from the second logic 534 that the set of journal entries has been written and that the file system transaction has completed. Recall that both a file and file metadata may be held in memory 520. At times, it may be convenient to hold metadata in memory 520 for as long as possible. Ultimately, however, metadata will be moved from memory 520 to disk, tape, solid state drive, or other more permanent storage. However, the metadata may not to be committed until the atomic operations that cause the metadata to change have actually been propagated to disk, tape, solid state drive, or other more permanent storage. This synchronization may be achieved using message passing to fourth logic 538.

In one embodiment, synchronization of the first logic 532, the second logic 534, the third logic 536, and the fourth logic 538 is message-based and lock-free.

Figure 7:
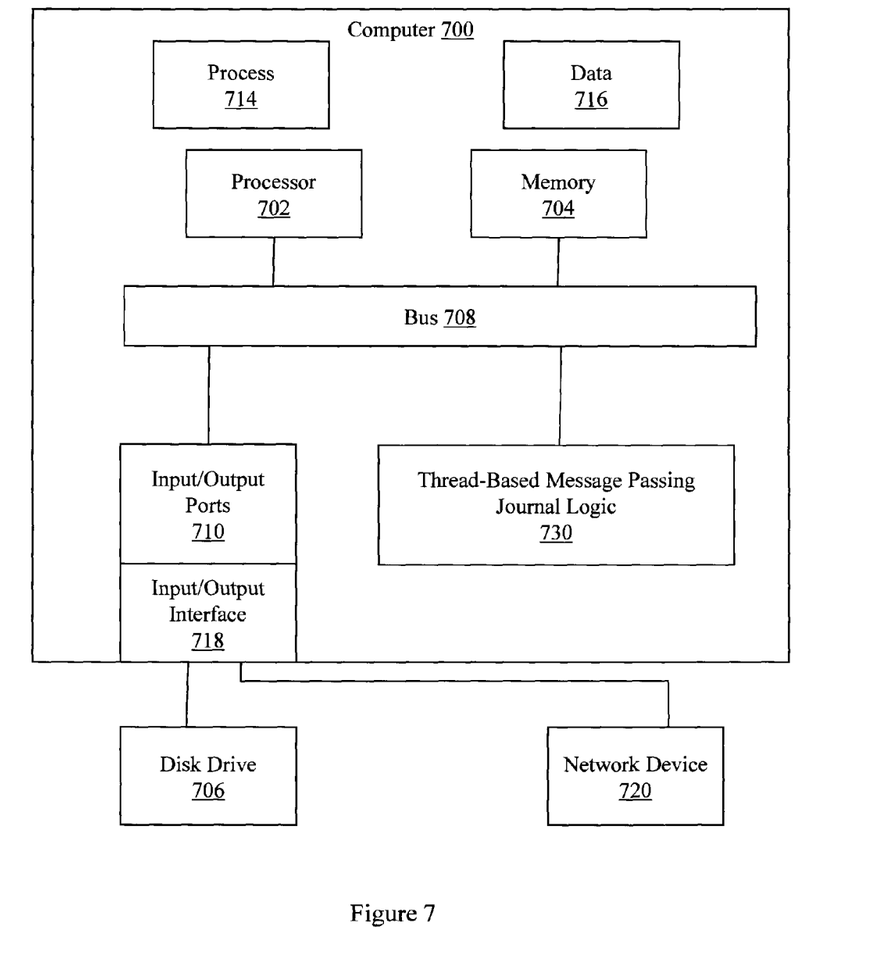
FIG. 7 illustrates an example apparatus associated with a multi-threaded message passing journal.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a multi-threaded message passing journal logic 730 configured to facilitate protecting a file system during processing of a file system transaction. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

In one embodiment, logic 730 may provide means (e.g., hardware, software, firmware) for protecting state in a file system using a message-passing multi-threaded journal. The means associated with logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and other memory. Volatile memory may include, for example, RAM, SRAM, DRAM, and other memory. The memory 704 can store a process 714 and/or a data 716, for example.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, or other device. Furthermore, the disk 706 may be a CD-ROM drive, a CD-R drive, a CD-RW drive, a DVD ROM drive, a Blu-Ray drive, an HD-DVD drive, or other device. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, network devices 720, and other devices. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks. Computer 700 may run a clustered file system that supports multiple computers.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method implementing a multi-threaded message passing journal, the method comprising:

controlling messaging between transaction threads associated with the multi-threaded message passing journal and a reservation thread associated with the multi-threaded message passing journal;

controlling messaging between the transaction threads and a sequencing thread associated with the multi-threaded message passing journal, controlling messaging between the sequencing thread and a reservation thread, controlling messaging between the transaction threads and a completion thread, receiving a file system transaction into the transaction threads, producing a set of atomic operations corresponding to the file system operation, where the set of atomic operations depends, at least in part, on operations supported by a storage, and where producing the set of atomic operations includes acquiring a journal entry buffer to store a journal entry concerning a member of the set of atomic operations, and populating the journal entry buffer with the journal entry, producing a set of journal entries corresponding to the set of atomic operations, upon determining that insufficient space to accommodate the set of journal entries is available in the storage, controlling the transaction thread to send a reserve space message to the reservation thread to request a reservation of space sufficient to accommodate the set of journal entries in the storage, controlling the transaction thread to send an operation ready message concerning a member of the set of atomic operations to the sequencing thread, controlling the sequencing thread to obtain input/output buffer space for writing the members of the set of atomic operations to the storage and to message a device thread to write a journal entry associated with the operation ready message to the storage in the space reserved for the set of journal entries, controlling the completion thread to send a completion message to the reservation thread upon determining that the set of journal entries has been written to the storage and that the set of atomic operations has completed successfully, controlling the completion thread to send a request flush message to the commitment thread, where the request flush message indicates that a portion of in-memory metadata should be flushed to disk, controlling the reservation thread to reclaim space in the storage upon determining that the portion of in-memory metadata has been flushed to disk, and controlling the sequencing thread to send the completion message to a commitment thread upon determining that the set of journal entries has been written to the storage and that the set of atomic operations has completed successfully, where the commitment thread is configured to selectively move metadata associated with the file associated with the file system transaction from a first transient storage location accessible to the file system to a second non-transient storage location accessible to the file system, where the reservation thread is configured to manage space in storage where the set of journal entries are to be stored to protect the file system during execution of the file system transaction, where the sequencing thread is configured to interact with device threads that performs input/output of the set of journal entries to the storage, and where the completion thread is configured to track metadata items that have been modified in memory and that are only protected by journal entries in the storage and to monitor completion of the set of atomic operations.

2. The non-transitory computer-readable medium of claim 1, the method comprising:
controlling the reservation thread to send a sufficient space message to the transaction thread upon determining that space sufficient to accommodate the set of journal entries has become available in the storage after receiving the reserve space message.

3. The non-transitory computer-readable medium of claim 1, the method comprising:
controlling the commitment thread to move the metadata from the first storage location to the second storage location upon receiving the completion message from the sequencing thread, and
controlling the commitment thread to send a metadata committed message to the reservation thread upon determining that the metadata has been moved from the first storage location to the second storage location.

4. The non-transitory computer-readable medium of claim 3, the first storage location being a computer memory, the second storage location being a disk drive, a tape, or a solid state drive.

5. The non-transitory computer-readable medium of claim 1, the method comprising:
controlling the transaction thread to send an operation ready message to the sequencing thread concerning the journal entry buffer.

6. The non-transitory computer-readable medium of claim 5, where the sequencing thread is configured to interact with the device thread by:
sending a write message to the device thread concerning the journal entry buffer,
receiving a written message from the device thread indicating that the journal entry has been written to the storage; and
sending a buffer free message to the sequencing thread indicating that the journal entry buffer has been written to storage.

7. An apparatus, comprising:
a processor;
a memory configured to store data and metadata affected by a file system transaction;
a set of logics comprising a first logic, a second logic, a third logic, and a fourth logic; and
an interface that connects the processor, the memory, and the set of logics;
where the first logic accepts the file system transaction from the file system, produces a set of atomic operations configured to complete the file system transaction, messages the third logic to request a reservation of space in the computer-readable medium upon determining that insufficient space to accommodate the set of journal entries is available, and messages the second logic to request that journal entries for the set of atomic operations be written to the computer-readable medium, where the set of atomic operations depends, at least in part, on operations supported by a computer readable medium, and where producing the set of atomic operations includes acquiring a journal entry buffer to store a journal entry concerning a member of the set of atomic operations, and populating the journal entry buffer with the journal entry;
where the second logic produces a set of journal entries associated with the set of atomic operations and controls recording the set of journal entries on a computer-readable medium, messages a writer to cause the set of journal entries to be written to the computer-readable medium, and messages the third logic to reclaim the space used for the set of journal entries upon determining that the set of atomic operations has completed successfully,
where the third logic co-ordinates usage of space on the computer-readable medium for the first logic and the second logic, and
where the fourth logic commits the metadata affected by the file system transaction from the memory to a non-volatile storage device upon receiving a message from the second logic that the file system transaction has completed,
where the first logic, the second logic, the third logic and the fourth logic communicate using message passing, and where synchronization of the first logic, the second logic, the third logic and the fourth logic depends on message passing.

8. The apparatus of claim 7, the third logic being configured to manage the storage as a circular buffer.

9. The apparatus of claim 8, where synchronization of the first logic, the second logic, the third logic, and the fourth logic is message-based and lock-free.

* * * * *

UNITED STATES PATENT AND TRADEMARK OFFICE
CERTIFICATE OF CORRECTION

| | |
|---|---|
| PATENT NO. | : 9,069,790 B2 |
| APPLICATION NO. | : 13/803541 |
| DATED | : June 30, 2015 |
| INVENTOR(S) | : Stephen P. Lord |

It is certified that error appears in the above-identified patent and that said Letters Patent is hereby corrected as shown below:

In the specification,

In column 4, line 33, delete "Figure one" and insert --FIG. 1--.

In column 4, line 52, delete "Figure two" and insert --FIG. 2--.

In column 6, line 59, delete "thread to" and insert --thread 240 to--.

In column 6, line 63, delete "journal." and insert --journal 200.--.

In column 6, line 66, delete "journal for" and insert --journal space for--.

In column 7, line 6, delete "journal is" and insert --journal 200 is--.

In column 7, line 8, delete "journal be" and insert --journal 200 be--.

In column 7, line 9, delete "system." and insert --system 210.--.

In column 7, line 12, delete "journal when" and insert --journal 200 when--.

In column 7, line 12, delete "activity. Thus" and insert --activity, thus--.

In column 7, line 61, delete "drive" and insert --drive.--.

In column 12, line 29, delete "not to be" and insert --not be--.

In column 13, line 1, delete "disk 706" and insert --disk drive 706--.

In column 13, line 3, delete "disk 706" and insert --disk drive 706--.

Signed and Sealed this
Seventeenth Day of May, 2016

Michelle K. Lee
*Director of the United States Patent and Trademark Office*

CERTIFICATE OF CORRECTION (continued)
U.S. Pat. No. 9,069,790 B2

In the specification,

In column 13, lines 6-7, delete "disk 706" and insert --disk drive 706--.

In column 13, line 9, delete "disk 706" and insert --disk drive 706--.

In column 13, line 24, delete "disk 706" and insert --disk drive 706--.